United States Patent [19]
Alley et al.

[11] Patent Number: 5,845,282
[45] Date of Patent: *Dec. 1, 1998

[54] METHOD AND APPARATUS FOR REMOTELY ACCESSING FILES FROM A DESKTOP COMPUTER USING A PERSONAL DIGITAL ASSISTANT

[75] Inventors: Peter E. Alley, Saratoga; Joseph G. Ansanelli, Palo Alto, both of Calif.

[73] Assignee: Apple Computer, Inc., Cupertino, Calif.

[*] Notice: This patent issued on a continued prosecution application filed under 37 CFR 1.53(d), and is subject to the twenty year patent term provisions of 35 U.S.C. 154(a)(2).

[21] Appl. No.: 511,978

[22] Filed: Aug. 7, 1995

[51] Int. Cl.⁶ .................................................. G06F 17/30
[52] U.S. Cl. ...................... 707/10; 707/104; 395/200.62
[58] Field of Search ............................. 395/200.03, 650, 395/200, 500, 169, 170, 400, 601, 616, 610, 615, 604, 200.01, 825, 200.62; 382/69; 364/200, 708; 345/173; 178/19; 380/25; 707/10, 104

[56] References Cited

U.S. PATENT DOCUMENTS

| | | | |
|---|---|---|---|
| 4,653,112 | 3/1987 | Ouimette | 382/69 |
| 4,686,332 | 8/1987 | Greanias et al. | 178/19 |
| 4,774,655 | 9/1988 | Kollin et al. | 364/200 |
| 5,007,085 | 4/1991 | Greanias et al. | 380/25 |
| 5,175,854 | 12/1992 | Cheung et al. | 395/650 |
| 5,224,060 | 6/1993 | Ma | 364/708 |
| 5,309,564 | 5/1994 | Bradley et al. | 395/200 |
| 5,313,578 | 5/1994 | Handorf | 395/200 |
| 5,329,619 | 7/1994 | Page et al. | 395/200 |
| 5,471,318 | 11/1995 | Ahuja et al. | 358/400 |
| 5,471,615 | 11/1995 | Amatsu et al. | 395/200.03 |
| 5,519,851 | 5/1996 | Bender et al. | 395/500 |
| 5,561,446 | 10/1996 | Montlick | 345/173 |
| 5,577,177 | 11/1996 | Collins et al. | 395/169 |
| 5,579,481 | 11/1996 | Drerup | 395/200.01 |
| 5,583,978 | 12/1996 | Collins et al. | 395/170 |
| 5,592,657 | 1/1997 | Johnson et al. | 395/200 |
| 5,630,168 | 5/1997 | Rosebrugh et al. | 395/825 |

OTHER PUBLICATIONS

Schilit et al, The PARCTAB Mobile Computing System, IEEE, pp. 34–39, Oct. 1993.
Christopher et al, Overview of Nine Evaluations of Pen Based Computers, PC Magazine, v12, n17, printed pp. 16–29, Oct. 1993.
John Rizzo, Windows in a Mac World, Mar. 1993, MacUser.
Farallon, "Connect Your PC to a Macintosh Network," 1993, Product Literature for Timbuktu for Windows.
Farallon, "Remote Control and File Transfer for Networks," 1993, Product Literature for Timbuktu Pro for Macintosh.
Farallon, "Your AppleTalk Connect for DOS and Windows," 1992–1994, Product Literature for PhoneNET PC 3.1.
Farallon, User's Manual to Timbuktu Remote, 1991, Chapter 5, pp. 63–74.

Primary Examiner—Paul R. Lintz
Assistant Examiner—Frantz Coby
Attorney, Agent, or Firm—Beyer & Weaver, LLP

[57] ABSTRACT

A method and apparatus for selecting and retrieving computer data files from a remote computer includes an automatic file translation mechanism. In one embodiment, the data being retrieved and the file translation mechanism are located on the same computer. The method of the invention includes establishing a data transfer link with the remote computer, displaying the files available for retrieval from the remote computer, selecting a file to be transferred, and translating the file prior to transfer. In one embodiment, the apparatus includes a pen-based computer and the remote computer is a desktop computer.

19 Claims, 12 Drawing Sheets

METHOD AND APPARATUS FOR REMOTELY ACCESSING FILES FROM A DESKTOP COMPUTER USING A PERSONAL DIGITAL ASSISTANT

BACKGROUND OF THE INVENTION

The present invention relates generally to computer systems and to communication between desktop and pen-based computer systems. More particularly, the present invention provides a method and apparatus for transferring and translating files from a desktop computer to a remote pen-based portable computer system.

Computers are becoming increasingly powerful, lightweight, and portable. The computing power of computers that once filled entire rooms is now residing on a desktop. Laptop, notebook, and sub-notebook computers are virtually as powerful as their desktop counterparts. Even smaller hand-held computers are now capable of computing tasks that required much larger machines a few short years ago.

As a part of this trend, computerized personal organizers are becoming increasingly popular with a large segment of the population. Computerized personal organizers tend to be small, lightweight, relatively inexpensive, and can perform such functions as keeping a calendar, an address book, a to-do list, etc. While many of these functions can also be provided in conventional computer systems, personal organizers are very well suited to the personal organization task due to their small size and portability. Personal organizers are available from many companies including Sharp and Casio of Japan.

A relatively new form of computer, the pen-based computer system, holds forth the promise of a marriage of the power of a general purpose desktop computer with the functionality and small size of a personal organizer. An example of a pen-based computer system is the Newton® 120 pen-based computer made and marketed by Apple Computer, Inc. of Cupertino, Calif.

A pen-based computer system is typically a small, hand-held computer where the primary method for inputting data includes a "pen" or stylus. A pen-based computer system is commonly housed in a generally rectangular enclosure, and is provided with a dual-function display assembly that can serve as both an input device and an output device. When operating as an input device or "tablet", the display assembly senses the position of the tip of a stylus on the viewing screen and provides this positional information to the computer's central processing unit (CPU). Some display assemblies can also sense the pressure of the stylus on the screen to provide further information to the CPU. When operating as an output device, the display assembly presents computer-generated images on the screen.

The dual-function display assemblies of pen-based computer systems permit users to operate the computer as a computerized notepad, among other functions. For example, graphical images can be input into the pen-based computer by merely moving the stylus on the surface of the screen. As the CPU senses the position and movement of the stylus, it generates a corresponding image on the screen to create the illusion that the stylus is drawing the image directly upon the screen, i.e., that the stylus is "inking" an image on the screen. By "ink" it is meant that pixels on the screen are activated in such a manner that it appears that the stylus is leaving a trail of ink on the display assembly. With suitable recognition software, the "ink" can be recognized to input text, numerics, graphics, and other recognized information into the pen-based system.

However, the practical utility of both pen-based and personal organizer devices has been limited by their inability to communicate efficiently with other computers, especially desktop computers, which hold information and software that would be useful if available on the pen-based or personal organizer device at a remote location. Such information might include, for example, calendar and personal information manager ("PIM") data, in addition to information contained in files such as word processor documents. The exchange of such data and software between a pen-based computer and a desktop computer has been hindered by the inability to provide a simple, remote connection between the desktop and pen-based computer in addition to the cumbersome interface software necessary for transferring and translating files between desktop and pen-based computers.

SUMMARY OF THE INVENTION

The present invention alleviates the above-described limitations of pen-based computers by providing facility for browsing and selecting files stored on a remote desktop computer from a pen-based computer in an intuitive and efficient manner. The present invention further provides for the transfer and optional translation of the selected files, again in a manner that is both intuitive and efficient. Thus, it will be seen that the present invention addresses two major short comings of present pen-based computers by providing users of these computers greater and more simplified access to the information stored on less mobile desktop systems.

In one aspect, the present invention provides a method for transferring data from a first computer system running a server program under a first operating system to a second computer system running a control program under a second operating system, the first and second computer systems being in communication through a communications medium. In one embodiment, a data transfer link from the control program on the second computer system to the server program on the first computer system is established. The second computer system then displays a list of files available on the first computer system which are available for translation and transfer. A file on the first computer system is then selected for transfer. The file is then translated and transferred to the second computer system.

In one embodiment, the exchange of information and commands is performed using a data structure comprising a header, a command block, a length block and a data block. The header comprises two blocks, the first block holding information effective to identify the second computer system and the second block containing information effective to identify a communications program on the second computer system that is transferring data with the first computer system over the data link. The command block and the length block each have a length of four-bytes and the length of the data block is an even multiple of four.

In a second aspect, the present invention provides a computer readable medium comprising program instructions for performing the above-described steps of establishing a data link between the first and second computer systems, displaying a list of available files on the second computer, selecting a file for transfer, and translating the selected file on the first computer system.

In a third aspect, the present invention provides an apparatus for selecting and receiving data stored on a remote computer system. The apparatus of the invention comprises, in one embodiment, means for establishing a data transfer link with the remote computer system. The means for establishing a data link are coupled to a remote file browser that receives file information for data stored on the remote computer system and displays the file information to a user of the apparatus. The file browser is coupled to a file selector that allows the user to identify at least one file to be transferred from the remote computer system to the computer apparatus. A translator that determines whether the selected file is to be translated in conjunction with the transfer of the file to the computer apparatus is coupled to the selector.

These and other advantages of the present invention will become apparent upon reading the following detailed descriptions and studying the various figures of the drawings.

BRIEF DESCRIPTION OF THE DRAWINGS

FIG. 10A is an illustration demonstrating the interface with regards to forming a connection between a pen-based computer and a desktop computer. FIG. 10B illustrates the display of directories and files following the formation of a connection between a pen based computer and a desktop computer. FIG. 10C illustrates the selection of a file on the remote desktop computer. FIG. 10D is an illustration showing the display of file information for the selected file shown in FIG. 10C.

DETAILED DESCRIPTION OF THE PREFERRED EMBODIMENTS

The present invention is well suited for pointer- or pen-based computer systems such as the pen-based, pen-aware, mouse, track ball, and track pad controlled systems that are currently popular. For the purposes of illustration, the invention will be described in connection with a pen-based system.

It will be appreciated that the invention employs various process steps involving data stored in computer systems. These steps are those requiring physical manipulation of physical quantities. Usually, though not necessarily, these quantities take the form of electrical or magnetic signals capable of being stored, transferred, combined, compared, and otherwise manipulated. It is sometimes convenient, principally for reasons of common usage, to refer to these signals as bits, values, elements, variables, characters, data structures, or the like. It should be remembered, however, that all of these and similar terms are to be associated with the appropriate physical quantities and are merely convenient labels applied to these quantities.

Further, the manipulations performed are often referred to in terms, such as identifying, running, or comparing. In any of the operations described herein that form part of the present invention, these operations are machine operations. Useful machines for performing the operations of the present invention include general purpose digital computers or other similar devices. In all cases, there should be borne in mind the distinction between the method of operations in operating a computer and the method of computation itself. The present invention relates to method steps for operating a computer in processing electrical or other physical signals to generate other desired physical signals.

The present invention also relates to an apparatus for performing these operations. This apparatus may be specially constructed for the required purposes, or it may be a general purpose computer selectively activated or reconfigured by a computer program stored in the computer. The processes presented herein are not inherently related to any particular computer or other apparatus. In particular, various general purpose machines may be used with programs written in accordance with the teachings herein, or it may be more convenient to construct a more specialized apparatus to perform the required method steps. The required structure for a variety of these machines will appear from the description given below.

Figure 1:
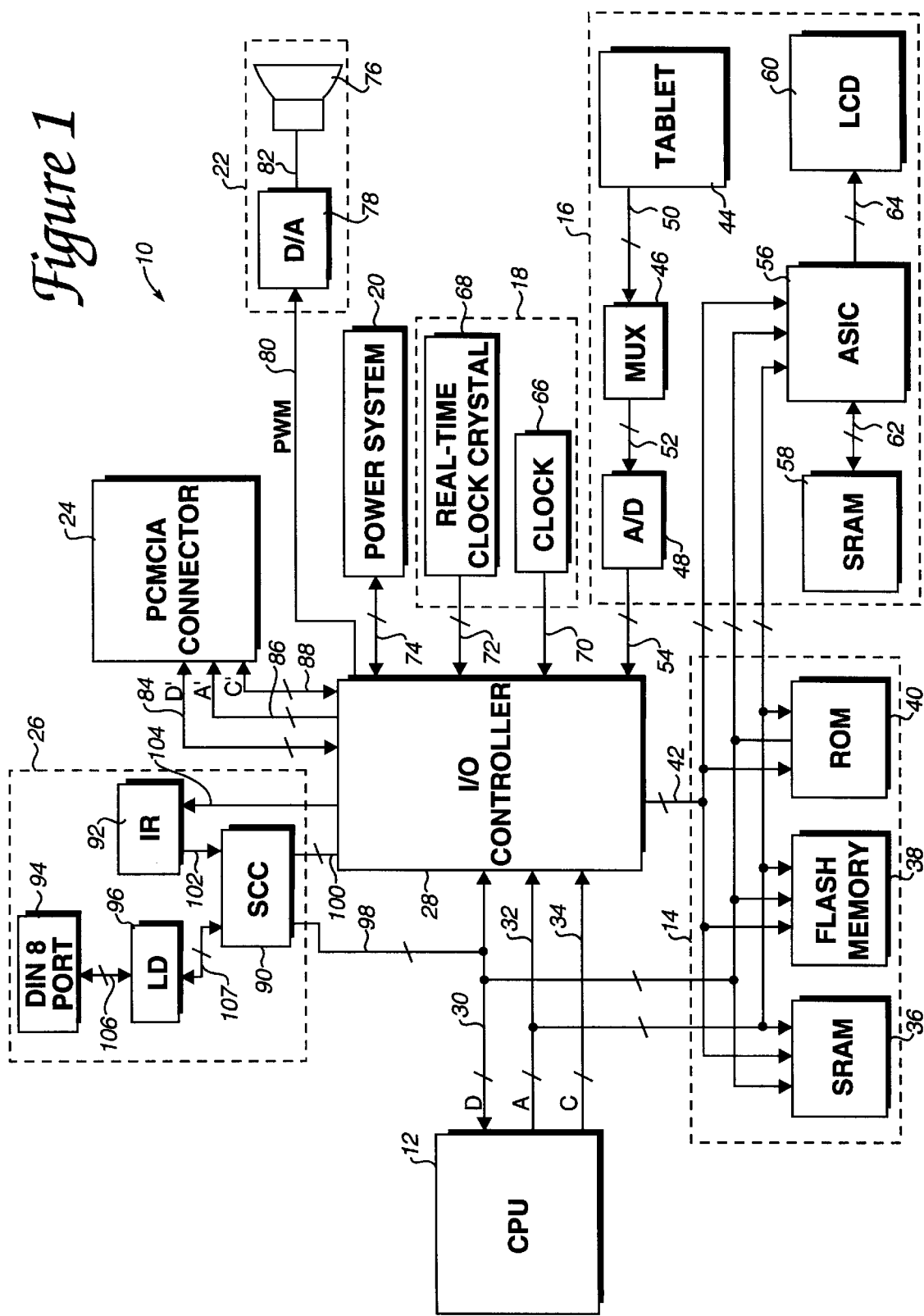
FIG. 1 is a block diagram of the electronics of a pen-based computer system in accordance with the present invention.

As shown in FIG. 1, a block diagram 10 of the electronics of a pen-based computer in accordance with the present invention includes a central processing unit (CPU) 12, a memory system 14, an input/output (I/O) dual function display system 16, a clock system 18, a power system 20, a sound system 22, a PCMCIA connector 24, and a serial I/O system 26. The various components and systems of the computer 10 are coupled together by an I/O controller 28 which serves as an interface between the CPU 12 and other components of the computer 10. More specifically, the I/O controller 28 is an application-specific integrated circuit (ASIC) designed to handle memory, peripherals, and I/O tasks, as well as housekeeping functions such as providing system clocks, controlling power usage, etc. The design, manufacture, and use of ASICs is well known to those skilled in the art. The pen-based computer 10 as illustrated is currently being manufactured and sold by Apple Computer, Inc. of Cupertino, Calif. as a Newton® 120 Personal Digital Assistant (PDA).

CPU 12 is preferably a commercially available, single chip microprocessor. While CPU 12 can be a complex instruction set computer (CISC) chip, it is preferable that CPU 12 be one of the commercially available, reduced instruction set computer (RISC) chips which are known to be of generally higher performance than CISC chips. In the present embodiment, the CPU 12 is preferably an ARM® 610 RISC chip operating at 20 megahertz and is available from a variety of sources including VLSI Technology, Inc. of San Jose, Calif. and Plessey Semiconductor of England. The present CPU 12 includes a 32 bit data (D) bus 30, a 32 bit address (A) bus 32, and an 8 bit control (C) bus 34.

The memory system 14 includes static random access memory (SRAM) 36, non-volatile read/write "flash" memory 38, and read-only memory (ROM) 40. The SRAM 36 serves as volatile "scratch pad" memory for the computer system 10 and, in the current system, includes 512 kilobytes of memory. The flash memory 38 is where user data is stored, preferably includes about 2 megabytes of memory, and is available as a standard product from Intel Corporation of Santa Clara, Calif. The ROM 40 stores the operating system and embedded application programs, and currently comprises approximately 8 megabytes of memory. Of course, there are many equivalents for the SRAM 36, flash memory 38, and ROM 40. For example, dynamic random access memory (DRAM) can be substituted for SRAM 36, battery-backed random accessed memory (RAM) can be substituted for flash memory 38, and a programmable read-only memory (PROM) can be substituted for the ROM 40.

The memory system 14 is coupled directly to the data (D) bus 30 and the address (A) bus 32. The memory system 14 is also coupled to a memory control bus 42 of controller 28. The CPU 12 and controller 28 cooperate to read and write data to the memory system 14 via the busses 30, 32, and 42.

The display system 16 serves as both an input device and an output device. More particularly, a tablet 44, multiplexer (MUX) 46, and analog-to-digital (A/D) converter 48 convert the contact of a stylus (see FIG. 2) with the tablet 44 and its subsequent movement over the tablet into digital data that is input to the controller 28. The tablet 44 is preferably a four-wire resistive membrane tablet and provides positional information on a bus 50 which is input into the MUX 46. The MUX 46 determines which of the four sides of the tablet is to be read. Such tablets are widely available from a variety of sources including Nissha of Japan. An output from the MUX 46 is input to A/D converter 48 on a bus 52. An output from the A/D converter 48 is input into the controller 28.

The display system 16 further includes an ASIC 56, a dedicated SRAM 58, and an LCD screen 60. The ASIC 56 is an LCD controller coupled to the data (D) bus 30, the address (A) bus 32, and the memory control bus 42. The purpose of the ASIC 56 is to allow the CPU 12 to write to the screen as if it were a RAM sitting on the memory bus 42. The SRAM 58 is coupled to the ASIC 56 by a dedicated bus 62, and the screen 60 is coupled to the ASIC 56 by a dedicated bus 64. The ASIC 56 serves as a controller for the screen 60, and uses the SRAM 58 as a frame buffer to store images to be displayed on the screen 60. The LCD screen 60 is preferably a standard super-twist LCD matrix screen available from a number of sources including Seiko-Epson of Japan. The LCD screen preferably comprises a rectangular array of picture elements or "pixels", as is well known to those skilled in the art.

The clock system 18 includes a main system clock 66 and a real-time clock (RTC) crystal 68. The main system clock is a four-terminal oscillator and is used to provide the master clock for the computer 10. In the present embodiment, the main system clock 66 operates at 40 megahertz. Oscillator clocks such as clock 66 can be commercially obtained from many sources including Seiko-Epson of Japan. This master clock may be divided down by the controller 28 for various timing purposes in the system, and is coupled to the controller 28 by a line 70.

The RTC crystal 68 is tuned to 32.768 kilohertz, which is evenly divisible by a power of 2. The RTC crystal 68 forms the basis of a crystal based oscillator that can provide a continuous, precise, uninterrupted signal at 1 hertz by dividing down the 32.768 kilohertz crystal signal with a 10 bit divider. The circuitry for performing this type of task is well-known, and form a part of controller 28 in this embodiment. The one hertz RTC signal increments a RTC counter (also a part of the controller 28) to count of the total number of seconds that has elapsed since midnight, Jan. 1, 1904 (an arbitrary start time). The value in the RTC counter can be converted into time of day and date information by relatively straight-forward calculations well known to those skilled in the art. Since the RTC crystal 68 is coupled to the controller 28 by a dedicated two-line bus 72 to provide the 32.768 kilohertz signal to the controller 28.

The power system 20 provides power to the computer 10 and is coupled to the controller 28 by a dedicated bi-directional bus 74. The bus 74 allows for the handling of fault detection signals (e.g., low power), switching on and off power to the PCMCIA connector, etc. The power system 20 preferably controls the power system 20 to conserve power at times of low usage of the pen-based computer system.

The sound system 22 includes a small (18 mm diameter) loudspeaker 76 and a D/A converter 78. The D/A converter 78 is coupled to the controller 28 by a line 80, and to the loudspeaker 76 by a line 82. In the present embodiment, the D/A converter 78 is a simple operational amplifier (OP AMP) which acts as an integrator to integrate pulse width modulation (PWM) signals developed on line 80 to provide an analog signal on line 82 to drive loudspeaker 76. Of course, more complex D/A converters can also be used to provide higher quality sound output from loudspeaker 76, as will be apparent to those skilled in the art. Suitable OP AMPS to be used as a D/A converter 78 are readily available on the commercial market, and the miniature loudspeaker is also readily available, such as from Hosiden of Osaka, Japan.

The PCMCIA connector 24 is coupled to the controller 28 by a dedicated data (D') bus 84, a dedicated address (A') bus 86, and a dedicated control (C') bus 88. The PCMCIA specifications for signals on the dedicated data, address, and control busses are industry standard and highly available as the "PC Card" or "PCMCIA" standard. A variety of devices can fit in the PCMCIA slot 24, including memory expansion cards, miniature hard disk drive cards, modem cards, and pager cards, to name a few.

The serial I/O system 26 includes a Serial Communications Controller (SCC) 90, an infrared (IR) transceiver 92, a serial port 94, and a line driver (LD) 96. The SCC 90 is coupled to the data bus (D) 30 by a bus 98 and to the controller 28 by a bus 100. A suitable SCC 90 can be purchased from Zilog Corporation of San Jose, Calif. as part number Z85C30. The Zilog Z85C30 has been available since at least the early 1980's and supports a number of serial protocols. The IR transceiver 92 is coupled to the SCC 90 by a line 102 for received IR signals, and to the controller 28 for IR signals to be transmitted. The IR transceiver includes an IR transmitter (coupled to line 104) and an IR receiver (coupled to line 102), and is available under license from Sharp Corporation of Japan. The IR receiver includes a PIN-type IR-sensitive diode having an output coupled to an analog demodulator and an amplifier to create a signal on line 102, an IR LED coupled to line 104 to be directly driven by a high-power switch of controller 28. The serial port 94 is a standard DIN 8 (8 pin) connector, and is coupled to the line driver LD 96 by an eight bit bus 106. The LD 96 is coupled to the SCC 90 by a bus 107.

Figure 2:
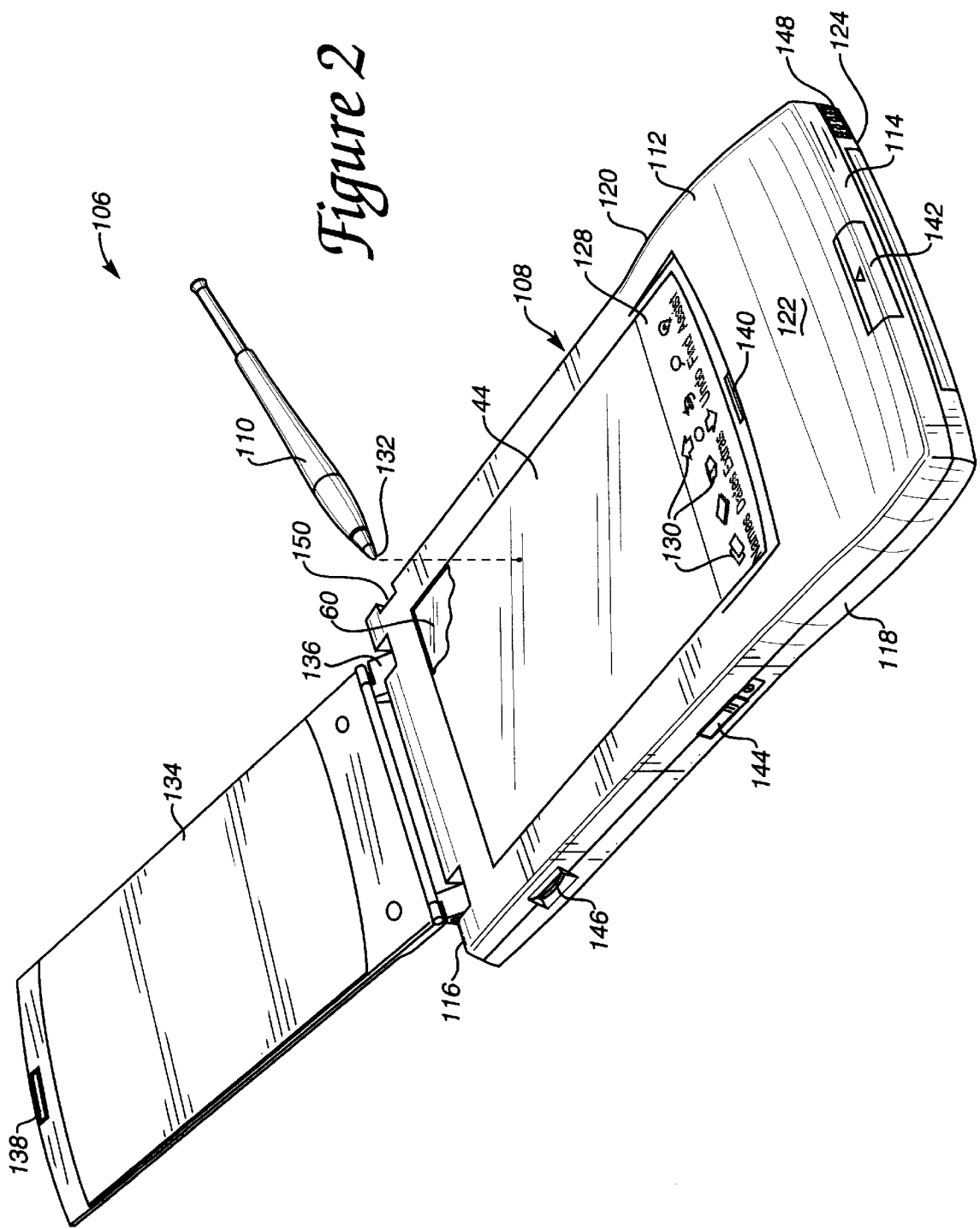
FIG. 2 is a perspective view of a complete pen-based computer system including a housing, display assembly, and stylus, where the electronics of FIG. 1 are enclosed within the housing.

Referring now to FIG. 2, a pen based computer system 106 in accordance with the present invention includes the computer 108 and a pen or stylus 110. The computer 108 is enclosed within a generally flat, rectangular case 112 having a front end 114, a back end 116, a left side 118, a right side 120, a top 122, and a bottom 124. The LCD 60 is positioned along the top 122 of the case 112, and the clear membrane tablet 44 is positioned over the LCD 60. Also positioned beneath the tablet 44 along a lower edge 126 thereof, is a printed strip of material 128 including a number of indicia 130. When the tip 132 of the stylus 110 is engaged with the membrane 44 over one of the indicia 130, the computer 108 can respond to the contact as if the indicia were a "button." Therefore, as used herein, a "button" can be an image seen through the tablet 44 (either from the screen 60 or from printed material 128 or the like) that can serve the function of an electro-mechanical button or the like when the tablet 44 is activated over a button image.

A lid 134 is connected to the back end 116 of case 112 by hinge 136. When open as shown or folded back to contact the bottom 124 of case 112, the tablet 44 and screen 60 are available for use. When the cover 134 is folded over the top 122 of case 112, it fully covers the tablet 44 to protect the delicate membrane material. The lid 134 is provided with a latch member 138 which engages a latch member 140 when it is overlying the top 122 of the computer. The latch member 138 is disengaged from the latch member 140 by a mechanical latch release 142.

Also seen in FIG. 2 is an "on" switch 144, a contrast adjustment 146, and a grille 148 for the speaker 76. The stylus 110 is of a collapsible design and can fit into an opening 150 along the right side 120 of case 112. Not seen in this figure along the right side 120 of the case 112 is an opening for a PCMCIA card which can engage PCMCIA connector 24, the DIN 8 port 94, and a power input jack. Not seen along the bottom 124 of the case 112 is a battery access cover and a mechanical ejection button for a PCMCIA card engaged with the PCMCIA connector 24. The IR port 92 is provided along back 116 of the case 112 and is exposed for use when the cover 134 is folded against the bottom 124 of the case 112. The remaining components and systems of the computer block diagram 10 of FIG. 1 are enclosed within the case 112 of the computer system 108.

It should be noted that the preceding discussion is of a preferred embodiment of the present invention, and that there are many alternatives for the stylus 110. For example, a fingernail or other pointed object could be used with the tablet 44 of the present invention. Also, there are other types of tablets available that utilize other types of styluses.

Other types of pointing devices can also be used in conjunction with the present invention. While the method of the present invention is described in the context of a pen-based system, other pointing devices such as a computer mouse, a track ball, a track pad, a tablet, etc. can be used to manipulate a pointer on a screen of a general purpose computer. Therefore, as used herein, the terms "pointer", "pointing device", "pointing apparatus", "pointing means", and the like will refer to any mechanism, device, or system for designating to a particular location on a screen of a computer display.

Figure 3:
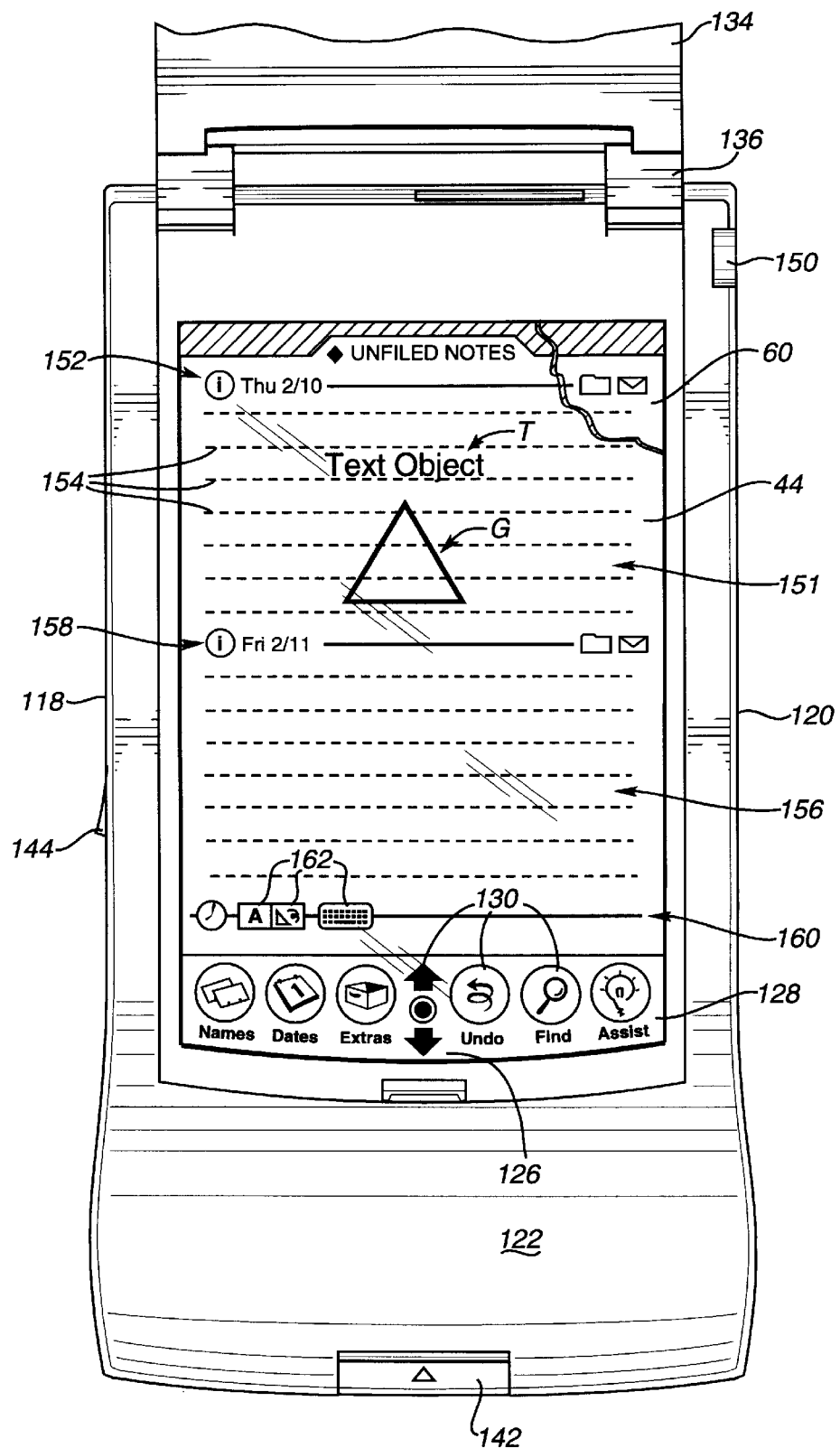
FIG. 3 is a top plan view of the housing and display assembly of pen-based computer system of FIG. 2.

With additional reference to FIG. 3, information is input into the pen-based computer system by "writing" on the tablet 44 with stylus 110 or the like. Information concerning the location of the tip 132 of stylus 110 on the tablet 44 of the display system 16 is input into the CPU 12 via the controller 28. Typically, this information comprises the Cartesian (i.e. x, y) coordinates of a pixel of the screen 60 over which the tip 132 of the stylus 110 is positioned. The CPU 12 then processes the data under control of an operating system (stored in ROM 40) and possibly an application program stored in the memory system 14 or elsewhere (such as on a PCMCIA card engaged with PCMCIA connector 24).

The CPU 12 next produces data which is transferred to the screen 60 via ASIC 56 to produce appropriate images on the screen.

Upon power-up, pen based computer system 106 displays on screen 60 an initial "note" area 151 including a header bar 152 and a number of guidelines 154. The header bar 152 preferably includes the date of creation of the note area 151 and a number of icons and "soft" buttons, not particularly germane to the discussion of the present invention. The guidelines 154 aid a user in entering text, graphics, and data into the pen-based computer system 106. A text object T of the text "Text Object" and a graphic object G of a triangle are shown as being entered within note area 151.

Additional note areas, such as a second note area 156, can be formed by the user by drawing a substantially horizontal line across the tablet 44 with the stylus 110. The substantially horizontal line is recognized by the computer system 106 and is converted into a second header bar 158. Additional text, graphical, and other data can then be entered into this second note area 156.

The screen illustrated in FIG. 3 is referred to as the "notepad", and is preferably an application program running under the operating system of the pen based computer system 10. In this preferred embodiment, the notepad is a special or "base" application which is usually or normally available beneath higher level applications. The notepad application, like other applications, run within a window, which in this instance comprises the entire screen 60. Therefore, as used herein, a "window" is the entire screen or any portion of an entire screen which is dedicated to a particular application program. A description of the operation and use of the notepad can be found in U.S. Pat. No. 5,398,310, assigned to the assignee of the present invention, and incorporated herein by reference.

A status bar 160 is provided at the bottom of the notepad application. The status bar 160 is provided with a number of active areas and a number of display areas, which again are not particularly germane to the present invention and will therefore not be discussed in detail herein.

The term "object" will be used extensively in the following discussions. As is well known to software developers, an "object" is a logical software unit comprising data and processes which give it capabilities and attributes. For example, an object can be queried as to its type and can return such data as the number of words that it contains, what its bounding box (BBOX) is, etc. Objects can contain other objects of the same or of a different type. Objects can also be used to project images on a screen according to their object type. Example of object types used in the following description include paragraph, line, and word objects. There are many well known texts which describe object oriented programming. See, for example, *Object Oriented Programming for the Macintosh,* by Kurt J. Schmucher, Hayden Book Company, 1986.

In the present invention, objects may be implemented as part of a frame system that comprises frame objects related by a semantic network. A description of semantic networks can be found in "A Fundamental Tradeoff in Knowledge Representation and Reasoning", *Readings in Knowledge Representation,* by Brachman and Leveseque, Morgan Kaufman, San Mateo, 1985.

It will be noted there is a liberal use of graphic elements in the present invention. For example, the header bars 152 and 158 include lines and other graphical elements. Processes for drawing lines on a computer screen are well known to those skilled in the art. For example, graphics software such as QUICKDRAW from Apple Computer, Inc. of Cupertino, Calif. can be used to draw lines, simple geometrical shapes, etc. A description of the QUICKDRAW graphics software is found in the book *Inside Macintosh*, Volumes I–VI, by C. Rose, et al., Addison-Wesley Publishing Company, Inc., July 1988. With such graphics software, a line can be drawn by simply specifying the coordinates of the beginning and the end of the line, and by specifying the width of the line.

Another preferred tool for implementing the system of the present invention is a view system. Various types of view systems are well known to those skilled in the art. In the present system, the notepad application on the screen 60 can form a first or "root" layer, with the status bar 160, for example, positioned in a second layer "over" the root layer. The various buttons 162 of the status bar 160 are positioned in a third layer "over" the second and root layers. The view system automatically handles "taps" and other gestures of the stylus 110 on the screen 60 by returning information concerning the tap or gesture and any object to which it may be related. U.S. patent application Ser. No. 07/976,970 filed Nov. 16, 1992, on behalf of Foster et al., entitled "Status Bar for Application Windows" and assigned to the assignee of the present invention describes a preferred view system and how to make and use the status bar, and is incorporated herein by reference.

The object oriented programming and view system software makes the implementation of the processes of the present invention less cumbersome than traditional programming techniques. However, the processes of the present invention can also be implemented in alternative fashions, as will be well appreciated by those skilled in the art.

Figure 4:
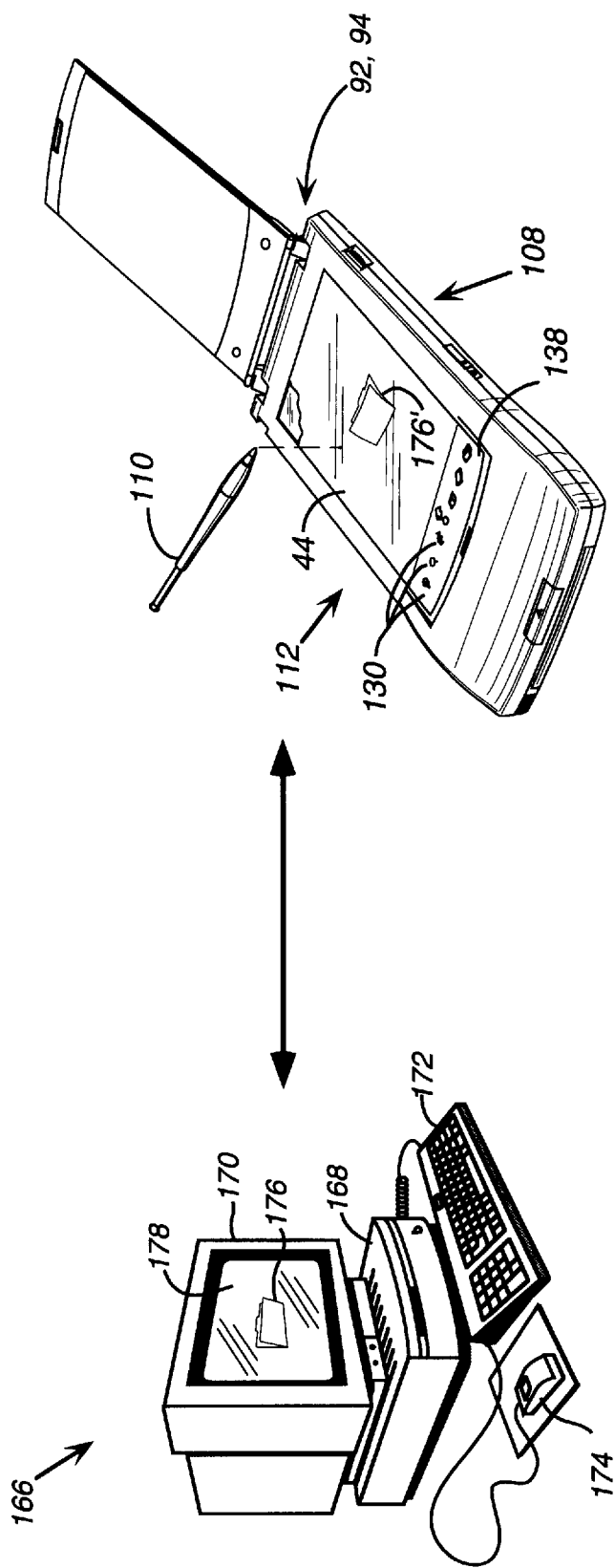
FIG. 4 is a schematic illustration of a communications link between a remote pen-based computer and a desktop computer.

Communication between a pen-based computer 108 and a desktop computer 166 is illustrated generally in FIG. 4. Desktop computer 166 includes a central processor unit ("CPU") in a housing 168, a monitor 170, keyboard 172 and, optionally, a mouse 174, as well known in the art. In one embodiment of the present invention, computer 108 includes the communications devices described above for use in communicating with desktop computer 166, e.g., through infrared or external connectors 92 and 94. Similarly, desktop computer 166 further includes one or more additional components for communication with remote pen-based computer 108. Such components include, for example, network connection hardware such as Ethernet or AppleTalk interfaces, modems, infrared interfaces, and the like, and can be located within housing 168 or coupled externally thereto. Such components will be familiar to those of skill in the computing and telecommunications arts.

Contained on storage media coupled to desktop computer 166 are one or more files and/or file directories such as represented by file icon 176 displayed on screen 178. These files can be stored on any media suitable for computer access and coupled to computer 166, such a hard disk, CD-ROM, floppy disk, tape drive or the like. Using stylus 110, or other control means, the user of remote pen-based computer 106 initiates the transfer of file 176 from desktop computer 166 to computer 108, e.g., by initiating actions using indicia 130 on strip 128, which actions are described in greater detail below. Following the file transfer, and any translation if appropriate, a copy of the file represented by icon 176 appears on screen 44 as indicated by icon 176'.

Figure 5:
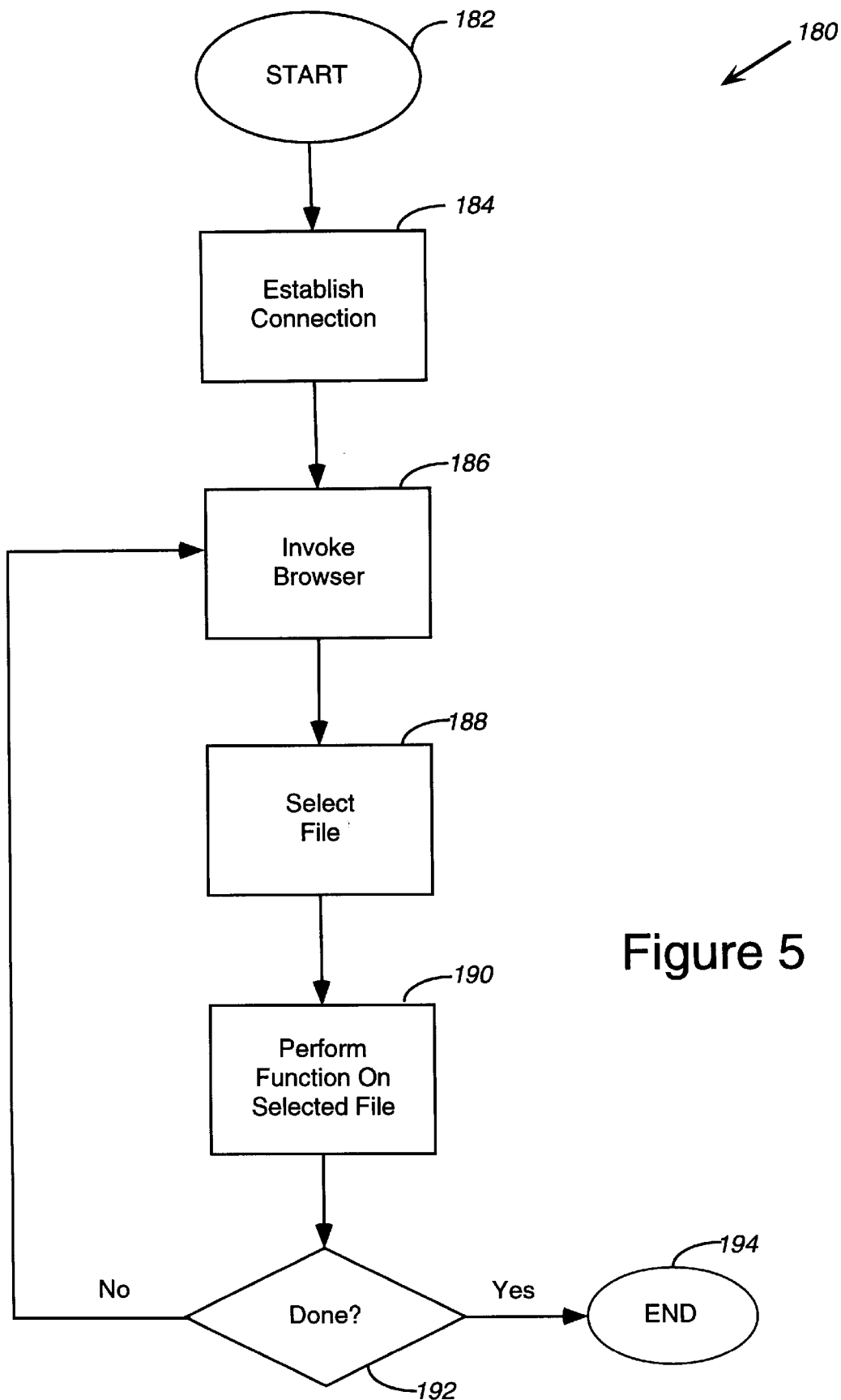
FIG. 5 is a computer flow diagram of an embodiment of the method of the present invention.

One implementation of the method of the invention is illustrated in FIG. 5 at 180. Beginning at step 182, a connection is established between a remote pen-based computer and a desktop computer at 184. The connection between the desktop and remote computer may be accomplished by any methods including, but not limited to, direct connection by cable, connection over a network, connection by modem or connection by infrared transmission. The connection may further include the use of protocols such as MNP, AppleTalk, TCP/IP or the like. These and other methods of establishing a connection will be familiar to those skilled in the computer and telecommunications arts.

In one embodiment, desktop computer 166 further includes a server program that communicates with software running on the remote pen-based computer. One example of such server software is that sold commercially as "Newton Connection Kit" by Apple Computer, Inc., of Cupertino, Calif. The server program runs under an operating system such as the Macintosh® operating system available from Apple Computer, Inc., of Cupertino, Calif. The pen-based computer runs a control program capable of exchanging data and instructions with the server program on the desktop computer, such as the above-described "Newton Connection Kit" software. The control program would run under an operating system adapted for the pen-based computer, such as the Newton® operating system, also available from Apple Computer.

At step 186, a browser function is invoked by the user of the remote pen-based computer to select one or more files for transfer and, optionally, translation, or to load a software package. At step 188 the file to be transferred or loaded from the desktop computer to the remote pen-based computer is selected and, at step 190, the desired function is performed on the selected file. The functions executed at step 190 can include, but are not limited to, file transfer, file translation, file loading, file deletion, file copying, file printing, and file moving. Other suitable functions will be apparent to those of skill in the computer software arts. At step 192, if all desired transactions have been completed, the procedure is terminated at step 194. Otherwise, step 186 is invoked again and the above-described sequence of steps 186–192 is repeated.

Figure 6:
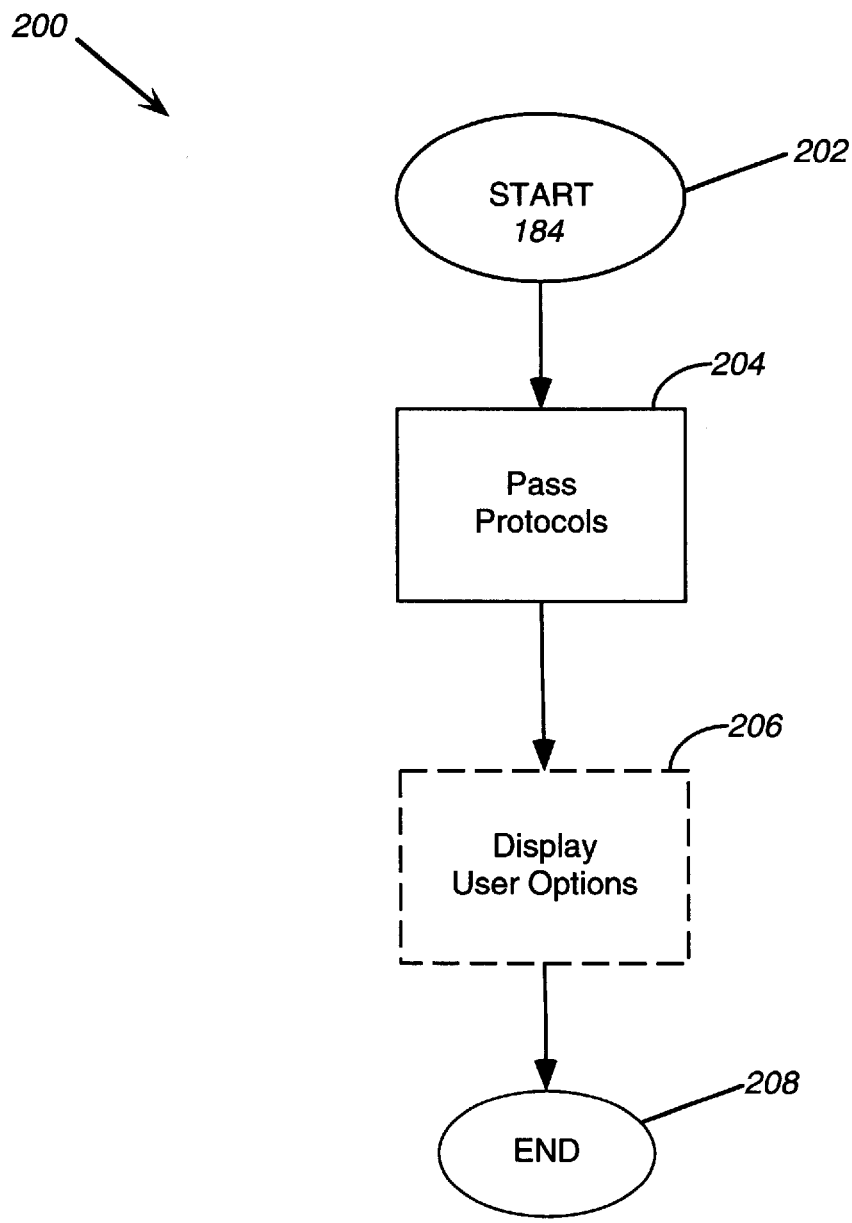
FIG. 6 is a computer flow diagram illustrating step 184 of FIG. 5 in greater detail.

Step 184 of FIG. 5 is illustrated in greater detail at 200 in FIG. 6. Beginning with step 202, following the establishment of a physical connection between the remote pen-based computer and the desktop computer, connection protocols are passed between the two machines at step 204. These protocols include the exchange of information such as the identities of the machines and the verification of passwords. Again, those of skill in the art of computer communication will appreciate that additional information may be exchanged at this stage. At step 206 the user of the remote pen-based computer may be offered a series of options for browsing and retrieving or loading files from the remote computer. Additionally, the user may at this point be presented with options for invoking actions at the desktop computer. Optionally, no options may be displayed to the user. Instead, the computer may simply initiate the browsing action 186 directly upon the establishment of the communications protocol between the remote and desktop computers. In either case, the sequence of operations terminates at step 208.

Figure 7:
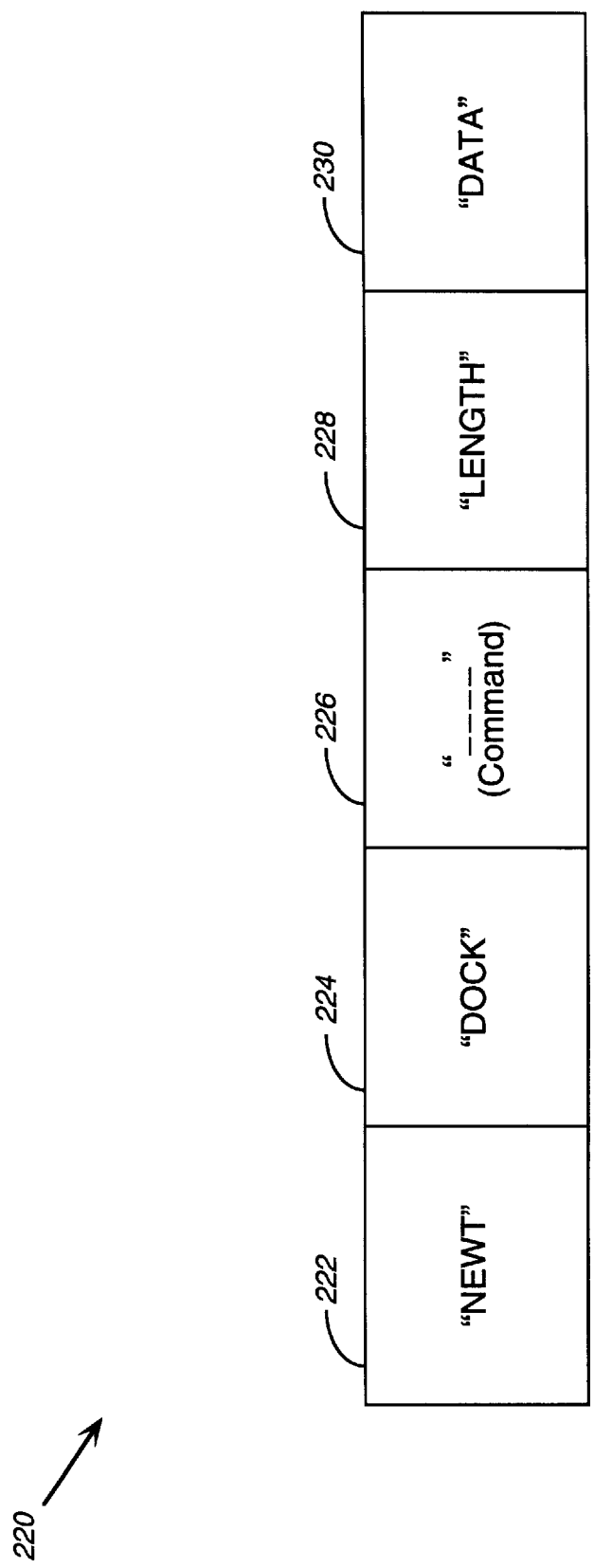
FIG. 7 is a schematic illustration of a data structure in accordance with the present invention.

The communications protocol established at step 204 includes the use of a data structure that is described in greater detail at 220 in FIG. 7. One protocol useful in the present invention is described in co-pending U.S. patent application Ser. No. 08/072,606 entitled "Method for Synchronizing and Achiving Information Between Computer Systems" by Peter Alley and Walter Smith, filed and assigned to the assignee of the present invention. In one embodiment, the communications protocol includes messages comprising five blocks, the first 4 blocks containing 4-bytes of information and the last block containing a variable amount of information. The first two blocks, 222 and 224, comprise a header, the third block 226 comprises a command, and the fourth block 228 comprises the length of data contained in the fifth block 230. Block 222 identifies the machine with which the desktop computer is in communication. In one embodiment, the desktop computer is a computer running the Macintosh® operating system (available commercially from Apple Computer, Inc., Cupertino, Calif.) which includes a desktop manager, and the remote computer is the above-described Newton® 120. The operation of the Macintosh® operating system and the desktop manager is described in the above-cited *Inside Macintosh*. In this embodiment, the header comprises the four byte word "NEWT" identifying the remote machine in communication with the desktop as a Newton, or Newton-type computer. The second block 224 indicates the software which is communicating with the desktop manager. In the embodiment shown, the software is the docking software of the Newton identified by the four-bit word "DOCK". The docking software is available commercially from Apple Computer, Inc., Cupertino, Calif.

The third block 226 can contain any command that can be executed by one of the communicating machines. Such commands can include, for example, commands to backup files, restore files, import files, load software packages, or to enter a password. However, many other commands, such as commands effective to access the Newton database, can also be used in place of the above-described commands. Such commands will be familiar to those of skill in the art of designing Newton software. Following the command in block 226, the length of any data associated with the command is provided as a four byte-word at 228. Finally, block 230 comprises any data associated with the command in block 226, which data is padded to achieve a size having a modulus of four. It will be appreciated by those having skill in the programming arts that other communications protocols may be employed without departing from the present invention.

Figure 8:
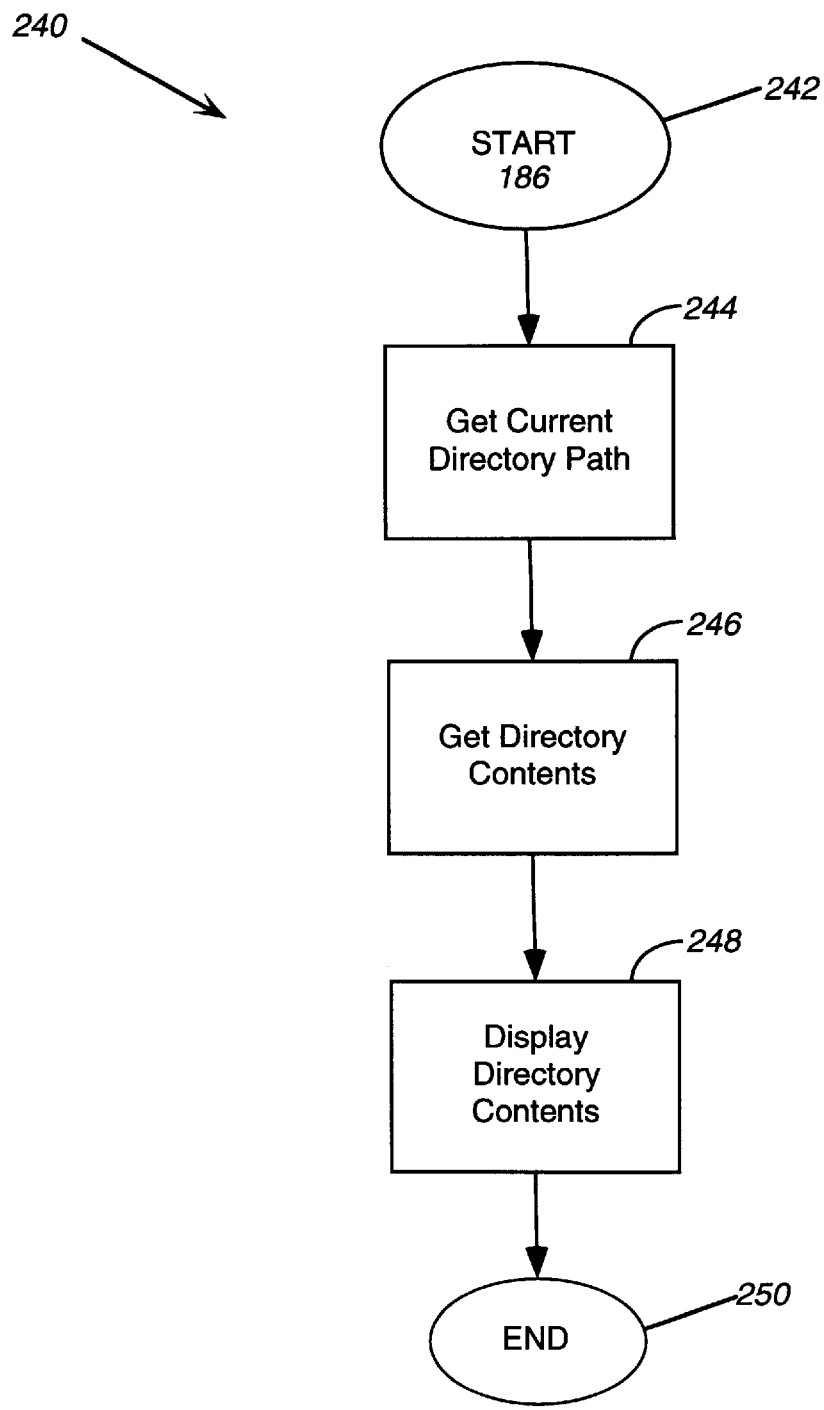
FIG. 8 is a computer flow diagram further illustrating step 186 of FIG. 5.

Once the file browser has been invoked at step 186 of FIG. 5, the sequence of operations illustrated at 240 in FIG. 8 is begun. Starting at step 242 the path of the current directory is retrieved from the desktop computer at step 244, and the contents of the current directory are obtained at step 246. These contents are displayed to the user at step 248 and the sequence terminates at step 250. These actions can be implemented using techniques well-known to those having skill in the art of programming, and especially those of skill in the art of programming Macintosh® and Windows™—based computers.

In one embodiment, the browser is invoked using an application programmer interface ("API") which includes information on the endpoint of the communication (i.e., the status of the communication indicating information such as whether the path of communication between the computers is open or closed, or busy, and the identification of any programs currently communicating across the communication link and the like). Also included in the API is a state function indicating how the browser was originally invoked so that control may return to the appropriate function once the file operation has been completed as described below. A label for the button presented to the user along with the files to be selected in addition to a filter identifying which file types can be retrieved is also provided. In the example where the desktop computer is running the Macintosh® operating system, the filter might include creator types and file types for the files to be retrieved from the desktop. These creator types and file types can be used to identify files such as software packages, import files to be translated, back-up files, extension files and the like. Furthermore, a call back function is provided so that control is returned to the process from which the browser was launched.

Figure 9A:
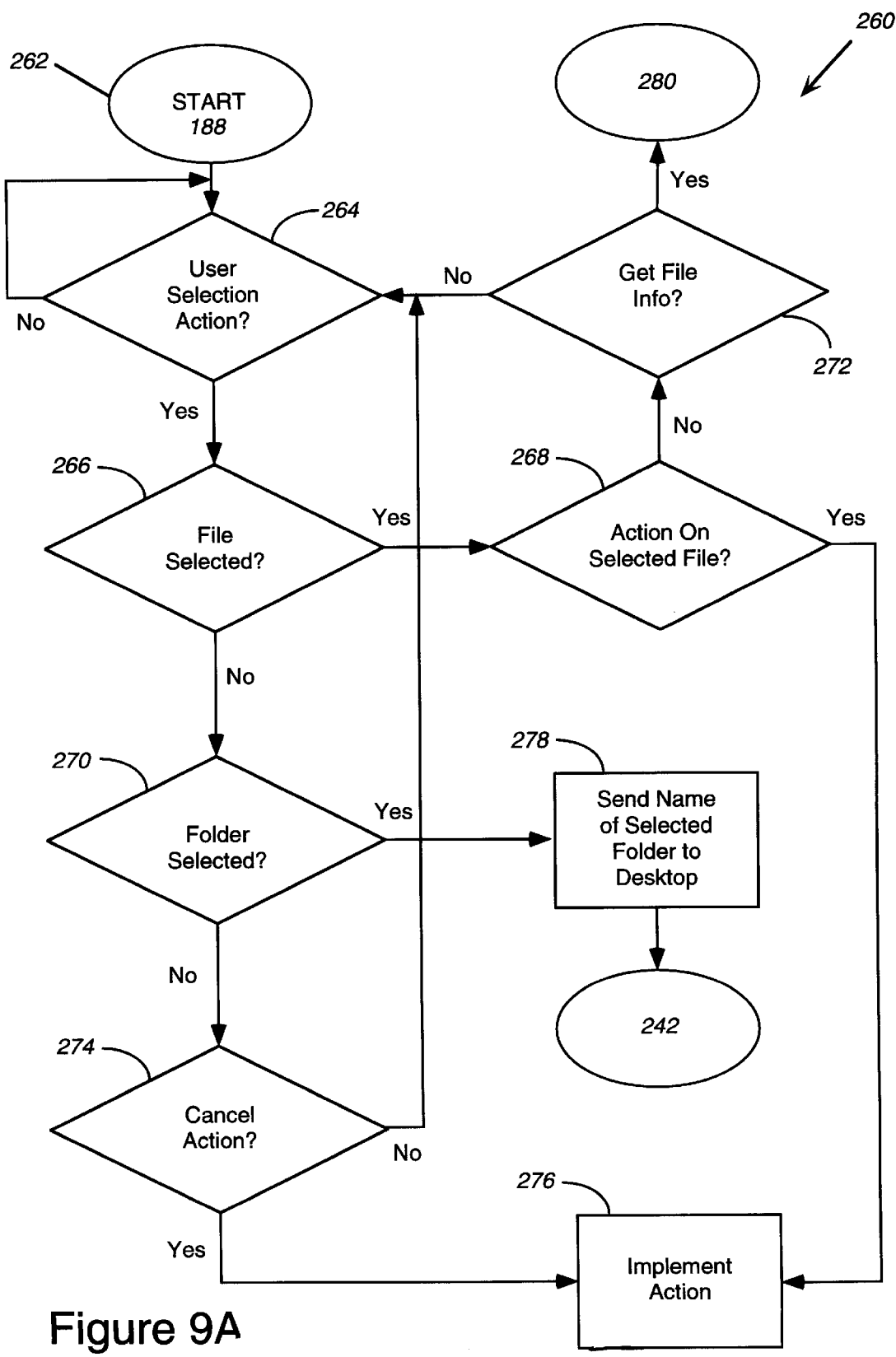
FIGS. 9A and 9B are computer flow diagrams illustrating step 188 of FIG. 5 in greater detail.
Figure 9B:
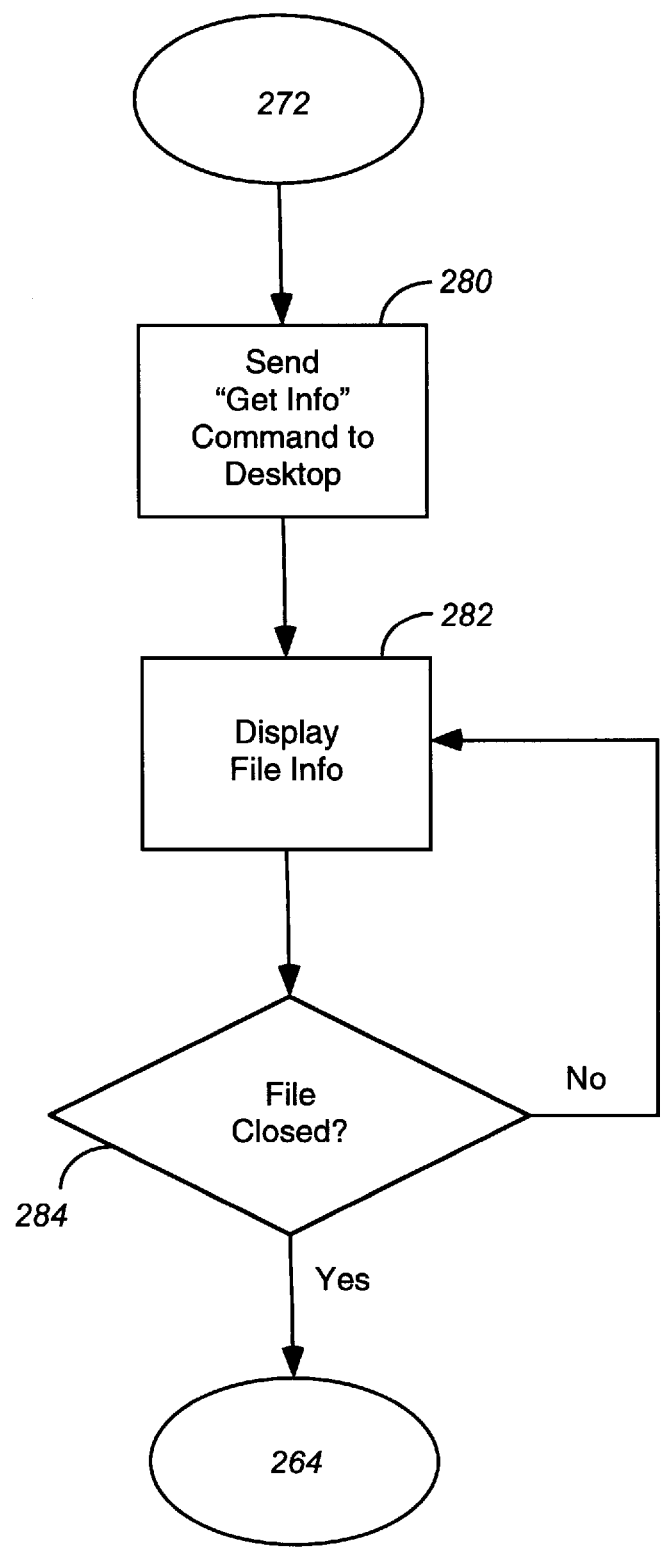

Once the appropriate files have been displayed to the user, control moves to the sequence shown at 260 in FIGS. 9A and 9B. Beginning at step 262 of sequence 260 in FIG. 9A, which indicates step 188 of FIG. 5 above, the system waits for a user selection action to occur at step 264. When a selection action is detected, a determination is made at step 266 as to whether a file has been selected. If a file has been selected, then at step 268 a determination is made as to whether an action is to be performed on the selected file. However, if no file is selected at step 266, then, at step 270, a determination is made as to whether a folder has been selected. If a folder has been selected, the name of the selected folder is returned to the desktop at step 278 so that its contents may be retrieved as described above in FIG. 8. If no folder is selected at step 270, then, at step 274, a determination is made as to whether the user has invoked a cancel action. If no cancel action is invoked at step 274, then the options for user input have been exhausted and control returns to step 264 where the system again waits for a user input action. However, if a cancel action has been invoked at step 274, then the action is implemented at step 276.

Returning to step 268, if an action is selected for a selected file, the action is implemented at step 276. Examples of possible actions that can be invoked on a file are described above. In one embodiment, the transfer of data files includes automatically any translation operations required to allow the user to access the file on the remote computer; and the transfer of any packages automatically invokes the mechanisms necessary to install the downloaded software onto the remote computer. The implementation of such automatic translation and/or loading will be familiar to those having skill in the art of programming, and especially those of skill in the art of programming Newton® computers.

In one embodiment, the translation occurs in response to information associated with the file, such as a header or a resource fork containing information identifying the file type and the application that created the file. The latter embodiment will be familiar to those of skill in programming for the Macintosh® computer. The translation is performed using translators, e.g., translation modules, that are located on the desktop computer. Following translation, the translated files are downloaded to the remote pen-based computer. It will be appreciated that such automatic features greatly facilitate the integration of portable, pen-based computers with desktop computers by freeing the user of the remote computer from burdensome file conversion operations and/or installation procedures. Alternatively, the translation can be performed using translation modules that are selected by the user of the remote pen-based computer. In addition, the translation can be done using translation modules that are located on the remote pen-based computer, the choice of translation module being made automatically or in response to user selection.

If, however, no action is selected for a selected file, then a determination is made at step 272 as to whether the file information ("file info") option has been selected. In one embodiment, such information describes the type and size of the file, the file's location, creation and modification dates, versions information, comments, memory settings for RAM allocation and a lock flag. If the query at step 272 is negative, then control again returns to step 264 whereupon the system awaits another user input selection action. However, if the get file info option is selected at step 272, then control moves to step 280 which is described in FIG. 9B. As illustrated in that Figure, invocation of the get info command causes a "Get Info" command to be sent to the desktop at step 280 which invokes the desktop manager to send the appropriate file information to the pen-based computer for display to the user at step 282. At step 284 a determination is made as to whether the user has terminated the display of the file information. If no termination is made, then the file info is continued to be displayed. However once the file information has been closed control returns to step 264 as described above.

Figure 10B:
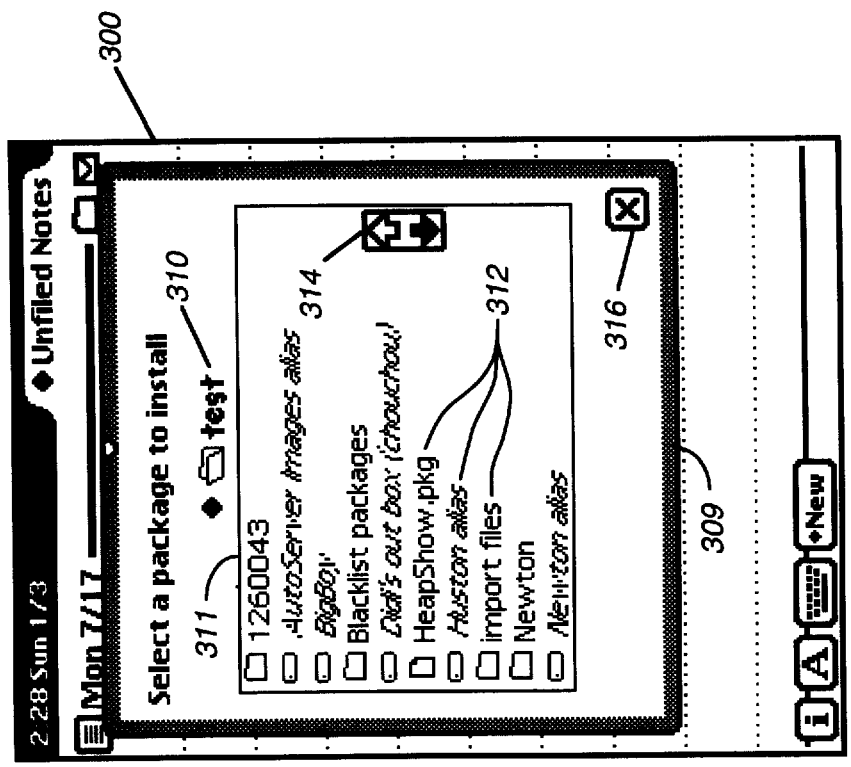
FIGS. 10A–10D illustrate an interface implementing the method of one embodiment of the present invention.
Figure 10A:
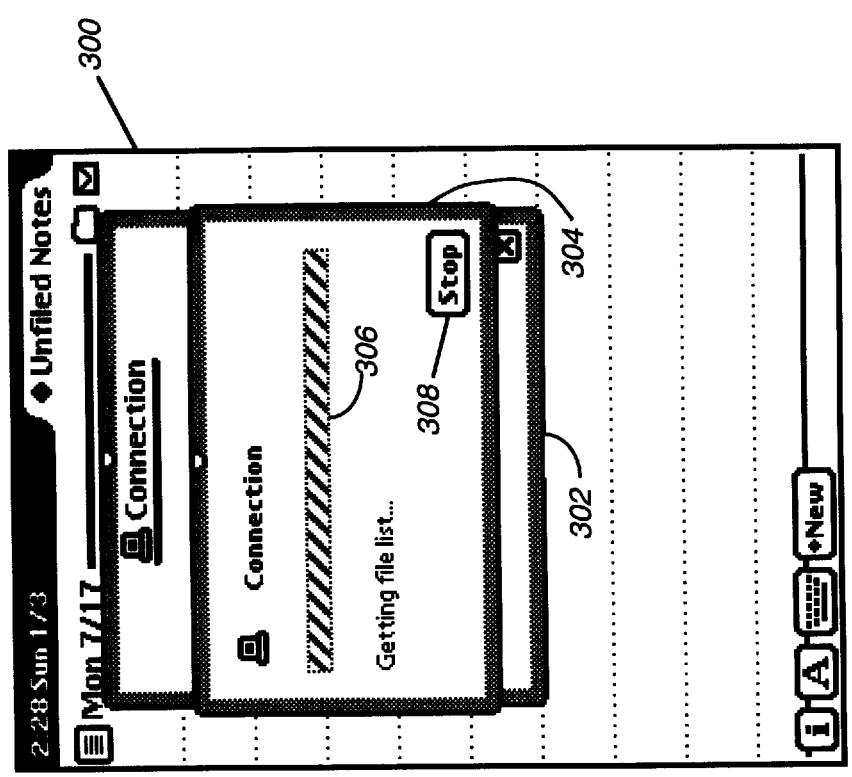

One embodiment of the present invention is illustrated with respect to FIGS. 10A–10D. FIG. 10A at 300 shows a typical application running on a Newton® 120 pen-based computer system. The application in the illustration is a note-taking application in which a user can enter various notes that are organized by the days of the week. As seen in the Figure the user has invoked a connection between the Newton (such as computer 108 shown in FIG. 4) and a remote desktop computer (such as shown at 166 in FIG. 4), initiation of which connection is illustrated by the appearance of a dialog box 302 indicating that a connection is being made. The status of the connection is shown in a second dialog box 304 in which the progress of the connection establishment is indicated by a "barber pole" 306. Dialog box 304 includes a "stop" button 308 that can be used to terminate the connection prior to its establishment.

Following the establishment of the connection, the list of files available from the desktop of the remote Macintosh is presented to the user in a dialog box 309 shown in FIG. 10B. This dialog box replaces dialog boxes 302 and 304 which are present only to describe to the user the status of the pending connection. Dialog box 309 includes the name of the directory that is currently being accessed at 310 which directory includes various software packages, files, directories and aliases of files and directories such as those shown at 312 ("Huston alias", "Import files", and "HeapShow.pkg") in scrolling window 311. The files can be browsed using the arrow controls shown at 314. The dialog box may be terminated by selection of termination button 316.

Figures 10C, 10D:
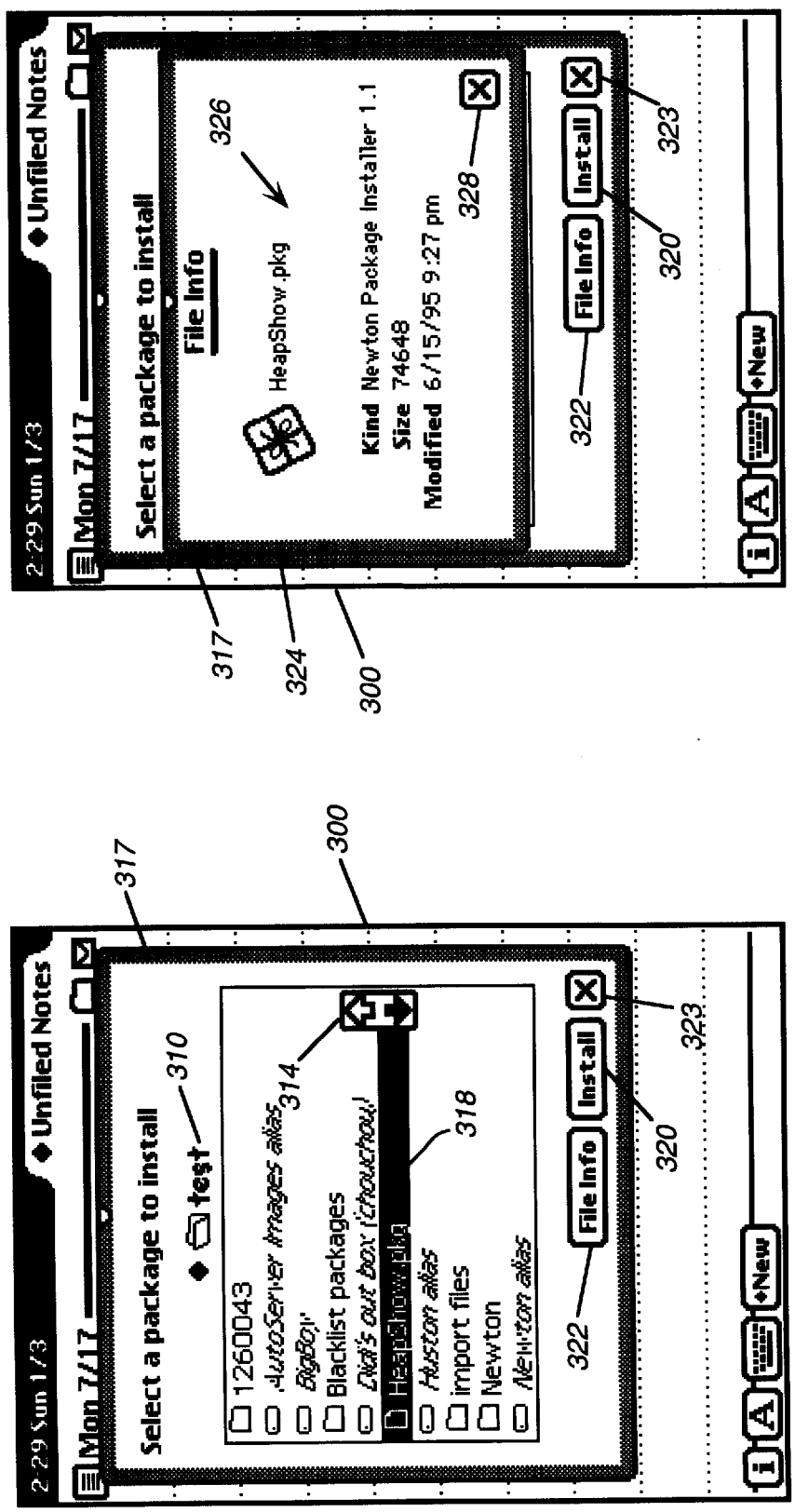

As shown in FIG. 10C, a user selection action of the file "HeapShow.pkg" is made as indicated at 318. Selection of that file causes replacement of the first window of window 309 with a second window 317, which window indicates the highlighted selection in addition to the unselected files and the directory containing those files. In addition, window 317 provides three buttons, a "File Info" button 322 for obtaining file information from the selected file, an "Install" button 320, and a cancel button 323 which terminates the display selected. Button 320 is displayed in response to selection of a file. The text of the button is specified at step 186 of FIG. 5. If the user was importing instead of installing, the button would be labelled "import" rather than "install."

Should the user chose button 322, the sequence of actions described above with respect to FIGS. 9A and 9B leads to the display shown in FIG. 10D. As shown in the Figure, window 317 is overlaid by a new window 324 which window displays the desktop file information for the file "HeapShow.pkg" as shown generally at 326. The new window 324 further includes a cancel button 328, the selection of which will terminate the display of the information shown in window 324. Following termination of window 324, the user is returned to the display as illustrated in FIG. 10C, at which point the user may chose to install the package by selecting button 320, terminate the selection process by selecting button 323, or return to the file info display by again selecting file info button 322. Alternatively, had the user selected the "Install" button 320 of FIG. 10C, the package "HeapShow.pkg" would have been downloaded and installed automatically on the remote computer.

While this invention has been described in terms of several preferred embodiments, there are alterations, permutations, and equivalents which fall within the scope of this invention. It should also be noted that there are many alternative ways of implementing the processes of the present invention. For example, much of the programming can be simplified by using the high-level utilities and data structures mentioned in the preceding specification. In particular, the described frame database system is preferred for simplifying the programming tasks required by the computer implemented processes of the present invention, but there are many other database and graphics systems which can be used to accomplish the same task.

It is therefore intended that the following appended claims be interpreted as including all such alterations, permutations, and equivalents as fall within the true spirit and scope of the present invention.

What is claimed:

1. A method for transferring data from a desktop computer system running a server program under a first operating system to a stand-alone pen-based computer system running a control program under a second operating system, the desktop computer system and the stand-alone pen-based computer system being in communication through a temporary and exclusive communications medium, the method comprising:

a) establishing a one-to-one and temporary data transfer link from the control program on the stand-alone pen-based computer system to the server program on the desktop computer system through the communications medium, where the pen-based computer system and the first computer system are not interconnected by any type of shared network but are in communication through the one-to-one and temporary data transfer link to permit data transfer therebetween;

b) displaying on the stand-alone pen-based computer system a list of files available on the desktop computer system which are available for translation and transfer;

c) selecting, on the stand-alone pen-based computer system, a file from the list of files being displayed on the desktop computer system for transfer;

d) translating the selected file on the desktop computer system using translators; and e) transferring the translated file from the desktop computer system to the stand-alone pen-based computer system over the one-to-one and temporary data transfer link, the stand-alone pen-based computer system having the ability of processing the translated file without depending on the desktop computer system.

2. The method of claim 1, wherein the step of establishing a data transfer link further includes exchanging information and commands using a record-type data structure including fields comprising a header, a command block, a length block and a data block.

3. The method of claim 2, wherein the header comprises two blocks, the first block holding information effective to identify the stand-alone pen-based computer system and the second block containing information effective to identify a control program on the stand-alone pen-based computer system that controls the transfer of data with the desktop computer system over the data transfer link.

4. The method of claim 3, wherein the header blocks, the command block and the length block each have a length of four-bytes and the length of the data block is an even multiple of four.

5. The method of claim 1, further including the step of displaying user options after the data transfer link has been established.

6. The method of claim 5, wherein the user options includes a file browser option to initiate a file browsing mechanism to view files stored on the desktop computer system.

7. The method of claim 1, wherein displaying a list of files available further comprises the steps of obtaining and displaying the path of the current directory from the desktop computer.

8. The method of claim 1, wherein translating comprises enumerating on the desktop computer system at least one translation module and its acceptable input file type.

9. The method of claim 8, wherein the step of enumerating is performed automatically in response to information associated with the file to be transferred.

10. The method of claim 9, wherein the information associated with the file is located in a resource fork associated with the file.

11. A computer readable medium comprising program instructions for:

a) establishing a one-to-one and temporary data transfer link from a control program on a stand-alone pen-based computer system to a server program on a desktop computer system through a temporary and exclusive communications medium, where the stand-alone pen-based computer system and the desktop computer system are not interconnected by any type of shared network but are in communication through the one-to-one and temporary data transfer link to permit data transfer therebetween;

b) displaying on the pen-based computer system a list of files available on the first computer system which are available for translation and transfer;

c) selecting, on the stand-alone pen-based computer system, a file from the list of files being displayed on the desktop computer system for transfer;

d) translating the selected file on the desktop computer system; and e) transferring the translated file from the desktop computer system to the stand-alone pen-based computer system over the one-to-one and temporary data transfer link, the stand-alone pen-based computer system having the ability of processing the selected file without depending on the desktop computer system.

12. The computer readable medium of claim 11, further comprising program instructions for displaying user options after the data transfer link has been established.

13. The computer readable medium of claim 12, wherein the user options include a file browser option to initiate a file browsing mechanism for view files stored on the desktop computer system.

14. The computer readable medium of claim 11, wherein the program instructions for displaying a list of files available further comprises program instructions for obtaining the path of the current directory from the desktop computer system; and obtaining the contents of the directory from the desktop computer system.

15. A stand-alone pen-based computer apparatus for reviewing, selecting and receiving data stored on a remote computer system, the apparatus comprising:

(a) means for establishing a one-to-one and temporary data transfer link with the remote computer system, where said stand-alone pen-based computer apparatus and the remote computer system are not interconnected by any type of shared network but are in communication through the one-to-one and temporary data transfer link to permit data transfer therebetween;

(b) a remote file browser, coupled to said means for establishing, said remote file browser receives file information for data stored on the remote computer system and displays the file information to a user of the stand-alone pen-based computer apparatus;

(c) a file selector, coupled to said remote file browser, said file selector allows the user to identify at least one file to be transferred from the remote computer system to the stand-alone pen-based computer apparatus, the stand-alone pen-based computer apparatus having the ability of processing a transferred file without depending on the remote computer system;

(d) a translator including one or more translation modules, coupled to said file selector, said translator determines whether the selected file is to be translated in conjunction with the transfer of the file to the stand-alone pen-based computer apparatus.

16. The computer apparatus of claim 15, wherein the means for establishing a data transfer link comprises a modem.

17. The computer apparatus of claim 15, wherein the means for establishing a data transfer link comprises an infrared communications means.

18. The computer apparatus of claim 15, wherein the browser is displayed automatically after the data transfer link has been established.

19. A method of transferring data from a desktop computer to a stand-alone pen-based computer where the desktop computer and the stand-alone pen-based computer are not related and can each operate independently of each other, the method comprising:

invoking a file browser on the stand-alone pen-based computer to enable viewing of lists of files available on the desktop computer for transfer;

determining what type of data is desired to be transferred;

determining whether the data should be translated using translators before being transferred facilitating access on the stand-alone pen-based computer;

determining whether the data should be loaded and installed on the stand-alone pen-based computer facilitating execution of the data on the stand-alone pen-based computer, the stand-alone pen-based computer capable of processing data independently of any other computer including the desktop computer;

creating a new and one-to-one connection between the desktop computer and the stand-alone pen-based computer; and extinguishing the new connection once the data has been transferred between the stand-alone pen-based computer and the desktop computer.

* * * * *